United States Patent
Sugiura (10) Patent No.: US 7,627,061 B2
(45) Date of Patent: *Dec. 1, 2009

(54) COMMUNICATION BREAKING DEVICE AND METHOD THEREOF

(75) Inventor: Akihiko Sugiura, 5-202 Takashijutaku, 2-1 Azahigashiura, Kitayama-cho, Toyohashi-shi, Aichi (JP) 441-8105

(73) Assignees: Ibiden Co., Ltd., Ogaki-shi (JP); Akihiko Sugiura, Toyohashi-shi (JP)

( * ) Notice: Subject to any disclaimer, the term of this patent is extended or adjusted under 35 U.S.C. 154(b) by 642 days.

This patent is subject to a terminal disclaimer.

(21) Appl. No.: 10/993,433

(22) Filed: Nov. 22, 2004

(65) Prior Publication Data

US 2005/0074077 A1    Apr. 7, 2005

Related U.S. Application Data

(63) Continuation of application No. 09/345,755, filed on Jul. 1, 1999, now Pat. No. 6,870,889.

(30) Foreign Application Priority Data

Mar. 24, 1999    (JP) ................................. 11-080181

(51) Int. Cl.
*H04L 27/06* (2006.01)
(52) U.S. Cl. ..................... 375/340; 375/371; 375/149; 375/141; 375/137; 455/1
(58) Field of Classification Search ............. 375/340, 375/371, 149, 141, 137; 455/1
See application file for complete search history.

(56) References Cited

U.S. PATENT DOCUMENTS

| 3,760,417 | A | 9/1973 | Haeff, et al. |
| 4,317,214 | A | 2/1982 | Attinello |
| 4,395,734 | A | 7/1983 | Rypkema |
| 4,876,545 | A | 10/1989 | Carlson |
| 5,157,688 | A | 10/1992 | Dell-Imagine |
| 5,260,707 | A | 11/1993 | Goldman |
| 5,742,417 | A | 4/1998 | Whitney |

FOREIGN PATENT DOCUMENTS

| EP | 0 891 110 | 1/1999 |
| JP | 05284074 A | 10/1993 |
| JP | 7-25639 | 5/1995 |
| JP | 7-154299 | 6/1995 |
| WO | WO 98/56192 | 12/1998 |

*Primary Examiner*—Temesghen Ghebretinsae
(74) *Attorney, Agent, or Firm*—Oblon, Spivak, McClelland, Maier & Neustadt, L.L.P.

(57) ABSTRACT

A communication breaking device for breaking communication of an apparatus which communicates by modulation and demodulation using a predetermined code sequence. The predetermined code sequence is extracted from an incoming wave and an inverted-code generator inverts the code sequence into an inverted code sequence, which is transmitted as a communication breaking wave. The phase of the inverted code sequence is advanced before transmitting as the communication breaking wave and the pilot signal, can appropriately be compensated with the advanced inverted code sequence. It can be recognized by a portable telephone that the portable telephone is deviated from a communication area for the base station. A method includes compensating the code sequence in an incoming wave by transmitting a communication breaking wave.

7 Claims, 7 Drawing Sheets

COMMUNICATION BREAKING DEVICE AND METHOD THEREOF

DETAILED DESCRIPTION OF THE INVENTION

1. Technical Field of the Invention

The present invention relates to a communication breaking device for breaking communication of a communication apparatus for modulating or demodulating information about the contents of communication by using a code sequence and to a communication breaking method, and more particularly to a communication breaking device and a communication breaking method capable of satisfactorily breaking communication in, for example, a CDMA (Code Division Multiple Access) method.

2. Related Art

In recent years, portable telephones and PHS (hereinafter collectively called "portable telephones") have rapidly and widely been used. Therefore, users of the mobile communication have been increased. Hence it follows that use of the telephone is permitted anywhere at any time. Therefore, great convenience is afforded. On the other hand, a variety of social problems, however, arise. For example, discourteous use, such as telephone conversion at a seat of the New Trunk Line, calling sound in a concert and problems of electronic medical apparatuses caused from use in a medical site, cause to troubles to erupt.

To prevent the foregoing troubles, the place in which the portable telephone is used is limited, a call to turn the power source off is issued if necessary or carry of the portable telephone is checked. However, an effective measure has not been taken. Therefore, an apparatus adaptable to the portable telephone which employs the TDMA (Time Division Multiple Access) has been marketed. The apparatus transmits a pseudo burst signal over a wide frequency range to interrupt communication and break conversation.

The apparatus for transmitting the pseudo burst signal to break communication, however, suffers from a problem in that communication cannot effectively be broken in only a small range of several meters. The next-generation portable telephone employs CDMA (Code Division Multiple Access) adapted to a spectrum diffusion technique. Therefore, there arises a problem in that noise resistance is excessively high to interrupt and break communication by using the simple pseudo burst signal as compared with the portable telephone adapted to the TDMA system.

In view of the foregoing, an object of the present invention is to provide a communication breaking device and a communication breaking method capable of maintaining a communication breaking space for a communication apparatus which modulates or demodulates information about the contents of communication by using a code sequence.

SUMMARY OF THE INVENTION

In order to accomplish the said object, a communication breaking device for breaking communication of a communication apparatus which modulates or demodulates information about contents of the communication with a predetermined code sequence, said communication breaking device according to the present invention comprising:

code sequence extracting means which is capable of extracting the predetermined code sequence from a received incoming wave;

code sequence inverting means which is capable of inverting the code sequence extracted by said code sequence extracting means into an inverted code sequence;

phase control means which is capable of advancing the phase of the extracted code sequence or that of the inverted code sequence; and breaking-wave transmitting means for transmitting the inverted code sequence having the advanced phase as a communication breaking wave.

According to the present invention, a code sequence extracted by a code sequence extracting means is inverted into an inverted code sequence by a code sequence inverting means. A phase control means advances the phase of the inverted code sequence. As an alternative to this, the phase of the extracted code sequence is advanced by the phase control means. The extracted code sequence is inverted into an inverted code sequence by a code sequence inverting means. The advanced inverted code sequence is, as communication breaking wave, transmitted from a breaking-wave transmitting means. Thus, the inverted code sequence, which is transmitted as the communication breaking wave, is formed into a code sequence inverted from a predetermined code sequence obtained by modulating information about the contents of the communication. Moreover, the phase of the inverted code sequence has been advanced. Therefore, the predetermined code sequence, which is being propagated, can appropriately be compensated with substantially no delay of the phase owning to the advanced inverted code sequence. That is, the code sequence is compensated. Therefore, information cannot be demodulated. Hence it follows that the communication can reliably be broken.

In accordance with the more preferred teaching of the present invention, the advancement is performed by said phase control means in a quantity corresponding to at least one code of the extracted code sequence or the inverted code sequence.

In accordance with the more preferred teaching of the present invention, the advancement is performed by the phase control means in a quantity corresponding to at least one code of the extracted code sequence or the inverted code sequence. Therefore, the inverted code sequence can be transmitted previously for a time corresponding to the one code. If the phase is delayed owing to signal processes which are performed by the code sequence extracting means, the code sequence inverting means, the phase control means and the breaking wave transmitting means, an influence of the delay can be eliminated in the foregoing period of time.

In accordance with the more preferred teaching of the present invention, said breaking-wave transmitting means incorporates electric-power amplifying means which is capable of arbitrarily control an amplification gain.

In accordance with the more preferred teaching of the present invention, the breaking-wave transmitting means incorporates electric-power amplifying means which is capable of arbitrarily control an amplification gain. Therefore, deviation of the phase can be complemented by converting change in the phase occurring due to various factors into electric power. Hence it follows that deviation of the phase which is changed randomly can be absorbed.

In accordance with the more preferred teaching of the present invention, said breaking-wave transmitting means intermittently transmits the communication breaking wave.

In accordance with the more preferred teaching of the present invention, the breaking-wave transmitting means intermittently transmits the communication breaking wave. Therefore, a period of time in which transmission of the communication breaking wave is interrupted can be created. As a result, a fact that the communication breaking device cannot extract the predetermined code sequence from the received incoming wave owning to the communication breaking wave transmitted from the communication breaking device can be prevented in the foregoing period of time in which the transmission is interrupted. Therefore, even after the predetermined code sequence has temporarily been extracted from the received incoming wave, the predetermined code sequence can again be extracted during the foregoing interruption period of time.

In accordance with the more preferred teaching of the present invention, the incoming waves are transmitted from a plurality of the communication apparatuses.

In accordance with the more preferred teaching of the present invention, the incoming waves are transmitted from a plurality of the communication apparatuses. Therefore, the advanced inverted code sequences are, as communication breaking waves corresponding to the plural communication apparatuses, transmitted from the breaking-wave transmitting means. As a result, the predetermined code sequences which are transmitted from the plural communication apparatuses can appropriately be compensated with the inverted code sequences corresponding to the plural communication apparatuses with substantially no delay of the phase.

In order to accomplish the said object, a communication breaking method adapted to a communication method which modulates or demodulates information about contents of communication with a predetermined code sequence, said communication breaking method according to the present invention comprising the step of: compensating the code sequence in an incoming wave by transmitting a communication breaking wave.

A communication breaking method adapted to a communication method which modulates or demodulates information about contents of communication with a predetermined code sequence, the communication breaking method according to the present invention comprising the step of: compensating the code sequence in an incoming wave by transmitting a communication breaking wave.

As the communication breaking wave, an inverted code sequence having an advanced phase is employed. The inverted code sequence is generated such that an incoming wave is received by the communication breaking device, followed by extracting a predetermined code sequence in the incoming wave, and followed by advancing the phase of the extracted code sequence after which the phase if inverted. As an alternative to this, the extracted code sequence is inverted, followed by advancing the phase. It is preferable that the advancement corresponds to at least one code of the inverted code sequence. The reason for this lies in that an influence of undesirable delay of the signal process can be eliminated in the foregoing period of time. When the communication breaking wave is transmitted, deviation of the phase may be complemented by converting the change in the phase in to electric power. It is preferable that the communication breaking waves are intermittently transmitted. The reason for this lies in that the predetermined code sequence can be extracted in the period of time in which the transmission of the communication breaking wave is interrupted. The incoming waves are transmitted from the plural communication apparatuses. Therefore, advanced inverted code sequences for use as the communication breaking waves corresponding to the plural communication apparatuses are transmitted. Hence it follows that the predetermined code sequences transmitted from the plural communication apparatuses can appropriately be compensated without delay with the inverted code sequences corresponding to the plural communication apparatuses.

EMBODIMENTS OF THE INVENTION

Embodiments of a communication breaking device and a communication breaking method according to the present invention will now be described with reference to FIGS. 1 to 7.

To make clear the characteristics of the communication breaking device according to the present invention, an example of the structure of a pilot signal for use in CDMA system, the communication of which is broken by the communication breaking device according to the present invention, will now be described with reference to FIG. 2.

The pilot signal, which will now be described, is transmitted through a pilot channel conforming to IS-95 Qualcomm, U.S.A. so as to be used to cause a portable telephone to determine whether or not the portable telephone is located in a communication area from a base station.

Figure 2:
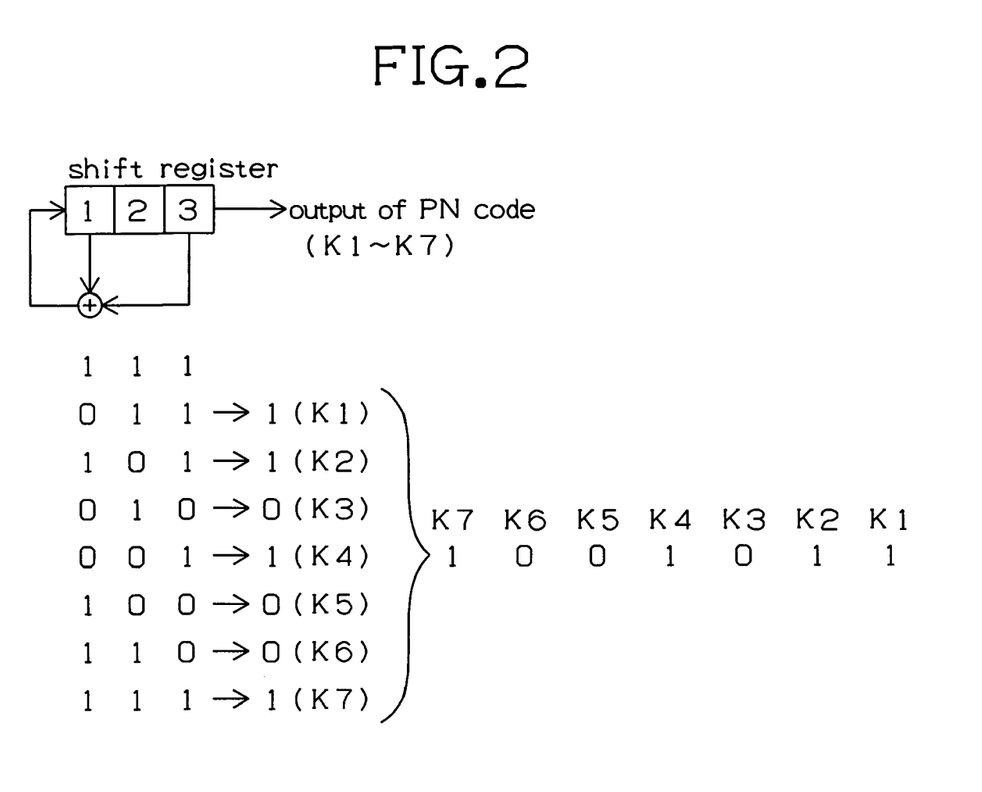
FIG. 2 is a diagram showing an outline of generation of a PN code sequence.

As shown in FIG. 2, the pilot signal is generated by a PN (Pseudo random Noise) code generator. The PN code generator incorporates n shift registers arranged as illustrated and feedback taps. To facilitate the description, a structure having three shift registers is illustrated. That is, the feedback tap extended from the first shift register (bit 1) and the third shift register (bit 3) is used to calculate an exclusive OR. A result of the calculation is returned to the first shift register (bit 1). Then, a sequential process for shifting each result to the upper shift register is performed. Hence it follows that a PN code sequence consisting of K1 to K7 and structured as shown in FIG. 2 is generated. The pilot signal including the foregoing PN code sequence is, as a pilot channel, transmitted from the base station to the portable telephone.

Also the pilot signal, which is transmitted from the base station as the pilot channel, is used to determine whether or not the portable telephone is located in the communication area of the base station by determining whether or not the portable telephone is able to recognize the foregoing signal. Therefore, break of the pilot signal transmitted from the base station inhibits the portable telephone to recognize the pilot signal if the portable telephone is located in the communication area. Therefore, the portable telephone is able to recognize a fact that the portable telephone is not located in the communication area of the base station, that is, a fact that the portable telephone is deviated from the communication area.

As a simplest structure for compensating and breaking the pilot signal, it might therefore be considered feasible to employ a structure incorporating an inverting amplifier which inverts the pilot signal received at an intermediate position of the propagation passage so as to again transmit the pilot signal. The foregoing apparatus, however, encounters exertion of an influence of a delay characteristic of a high-frequency amplifier for use in the inverting amplifier. Thus, the pilot signal cannot be compensated with a satisfactory accuracy. To reliably compensate the pilot signal, electric waves must be generated with electric power larger than that required to generate the pilot signal. Therefore, present regulatory constraints, such as the electric-wave law, inhibits satisfactory break of the communication. The received wave propagated as described above is usually deformed owning to noise and distortion of the signal occurring in the propagation passage. Therefore, a fact has been known that amplification of the distorted signal deteriorates the efficiency.

To overcome the above-mentioned plural problems, the communication breaking device and the communication breaking method according to the present invention employ the following structure. Thus, breaking of communication is realized such that a communication breaking space is maintained for the CDMA portable telephone.

Figure 1:
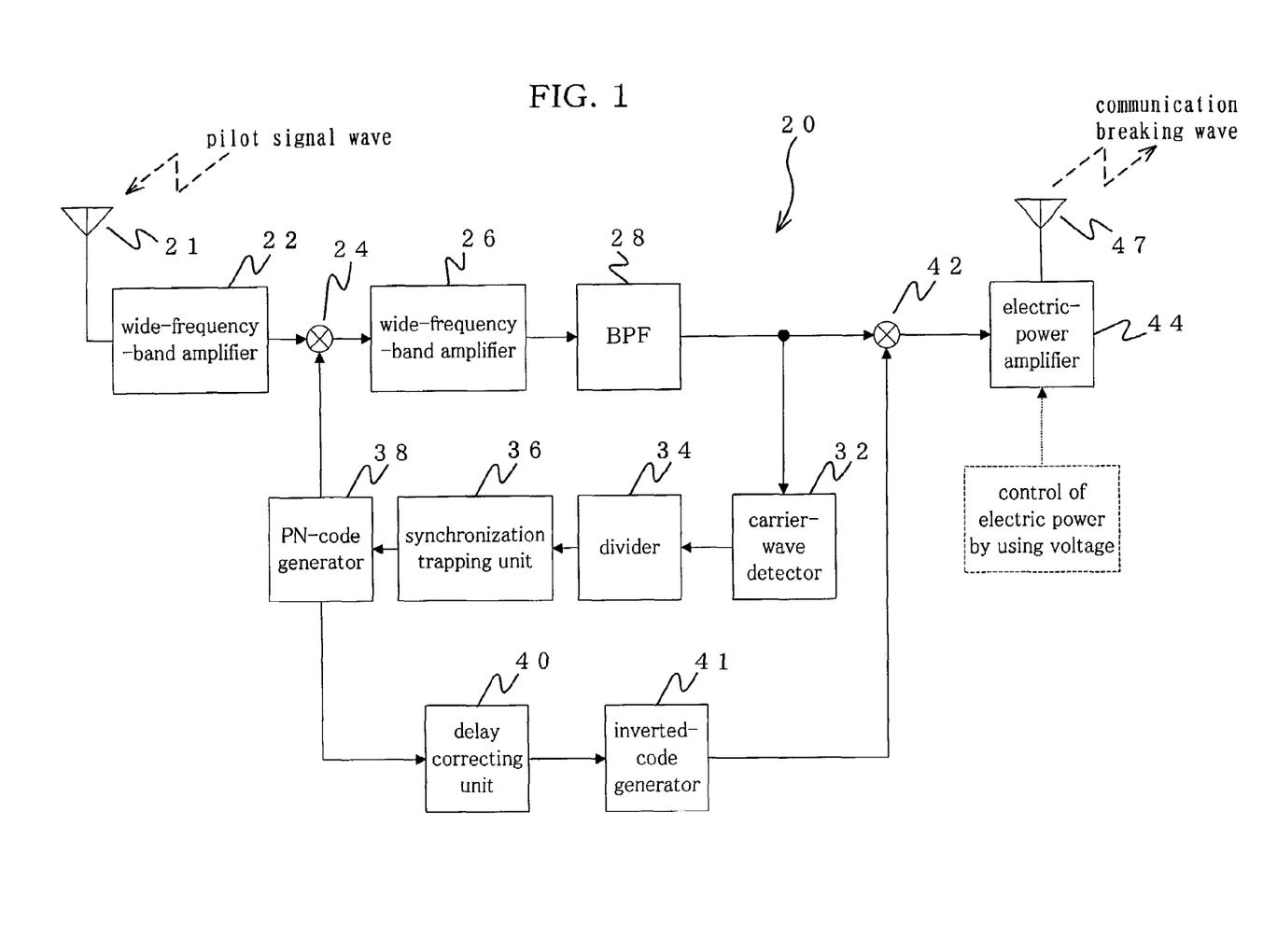
FIG. 1 is a block diagram showing the structure of a communication breaking device according to an embodiment of the present invention.

As shown in FIG. 1, a communication breaking device 20 mainly incorporates a receiving antenna 21, a wide-range amplifier 22, a multiplier 24, a wide-range amplifier 26, a bandpass filter (hereinafter called a "BPF") 28, a carrier-wave detector 32, a divider 34, a synchronization trapping unit 36, a PN-code generator 38, a delay correcting unit 40, an inverted-code generator 41, a multiplier 42, an electric-power amplifier 44 and a transmitting antenna 47.

An incoming wave received by the receiving antenna 21 is amplified by the wide-range amplifier 22 having a predetermined gain, and then inversely diffused by the PN code sequence generated by the PN-code generator 38, to be described later, and the multiplier 24. A primarily modulated signal which has inversely be diffused, is again amplified by the wide-range amplifier 26 having a predetermined gain. Then, the signal is allowed to pass through the BPF 28 so that a carrier signal in which data has been super imposed is extracted. The extracted carrier wave is divided to realize a predetermined ratio by the carrier-wave detector 32 and the divider 34. Moreover, the synchronization trapping unit 36 traps synchronization. Thus, a code clock can be obtained. The obtained code clock causes the PN-code generator 38 to generate a predetermined PN code. Then, PN code sequence is supplied to the multiplier 24 for performing inverse diffusion. Also the PN code sequence is supplied to the delay correcting unit 40 disposed in the rear of the PN-code generator 38.

The PN code sequence, which is supplied to the delay correcting unit 40, has been subjected to a process for advancing its phase as described later. Therefore, the phase of the PN code sequence has been advanced as compared with the phase of the PN code sequence, which is supplied to the multiplier 24, in a quantity corresponding to predetermined bits. The PN code sequence, which has been supplied as described above and, the phase of which has been advanced, is subjected to a proper delay correction by the delay correcting unit 40. Then, the PN code sequence is, by the inverted-code generator 41, inverted into an inverted code sequence having an inverted signal level. The carrier wave extracted previously is, by the multiplier 42, diffusion-modulated with the inverted code sequence. Thus, a communication breaking wave, which is the pilot signal having the inverted sign, is generated. The communication breaking wave amplified to predetermined electric power by the electric-power amplifier 44 is transmitted through the transmitting antenna 47. As described later, the electric power of the electric-power amplifier 44 is controlled (by −35 dB) with, for example, voltage. Therefore, furthermore effective communication break can be performed.

The PN code sequence which is supplied from the PN-code generator 38 to the multiplier 24 and the delay correcting unit 40 will be described again referring to FIG. 2.

The PN-code generator 38 is composed of 127 shift registers arranged as illustrated and feedback taps and structured similarly to the structure of the PN-code generator of the base station. As a result, a PN code sequence similar to the PN code sequence transmitted from the base station can be obtained. Therefore, the multiplier 24 performs inverse diffusion with the PN code sequence having a length of 127 bits.

On the other hand, the phase of the PN code sequence, which is supplied to the delay correcting unit 40, is advanced in a quantity corresponding to the predetermined bits as compared with the phase of the PN code sequence which is supplied to the multiplier 24. That is, the PN code sequence which is advanced by one bit as compared with the PN code sequence which is supplied to the multiplier 24, is supplied to a tap disposed before the 127-th shift register by one bit. That is, the PN code sequence is supplied from the 126-th shift register to the delay correcting unit 40. As a result, the PN code sequence having the phase advanced by one bit is supplied to the delay correcting unit 40. As a result, an inverted code sequence factoring in a delay time caused from the signal process, which is performed in the communication breaking device 20, can be generated. The reason why the phase is, by the PN-code generator 38, advanced by one bit will now be described. Since deviation corresponding to one bit of the PN code in the case of the IS-95 system (code velocity: 1.228 MHz) corresponds to about 244 m in distance terms, a larger deviation in the distance of the portable telephone is considered very rare. In this embodiment, the PN code sequence is supplied from the tap (the 126-th shift register) disposed one bit before the 127-th shift register to the delay correcting unit 40. In a case of a higher code velocity, a tap may be extended from a shift register disposed two bits before (the 125-th shift register) or that disposed three bits before (the 124-th shift register) to supply the PN code sequence to the delay correcting unit 40.

The delay correcting unit 40, which receives the PN code sequence having the phase advanced by one bit, performs further accurate delay correction. Thus, an inverted code sequence, the delay of which has appropriately been compensated, can be obtained by the inverted-code generator 41. If the phase is excessively advanced owning to extraction of the PN code sequence from the tap before the shift register constituting the PN-code generator 38 by one bit, the delay correcting unit 40 delays the phase. Thus, accurate adjustment of the phase can be performed. As a result, the delay of the inverted train obtained from the inverted-code generator 41 has appropriately been compensated. Note that the delay correcting unit 40 constitutes a variety of delay elements including delay lines and D-type flip flops so as to be capable of controlling the delay time.

The control of electric power which is performed by the electric-power amplifier 44 of the communication breaking device 20 will now be described with reference to FIGS. 3 to 5.

Figure 3:
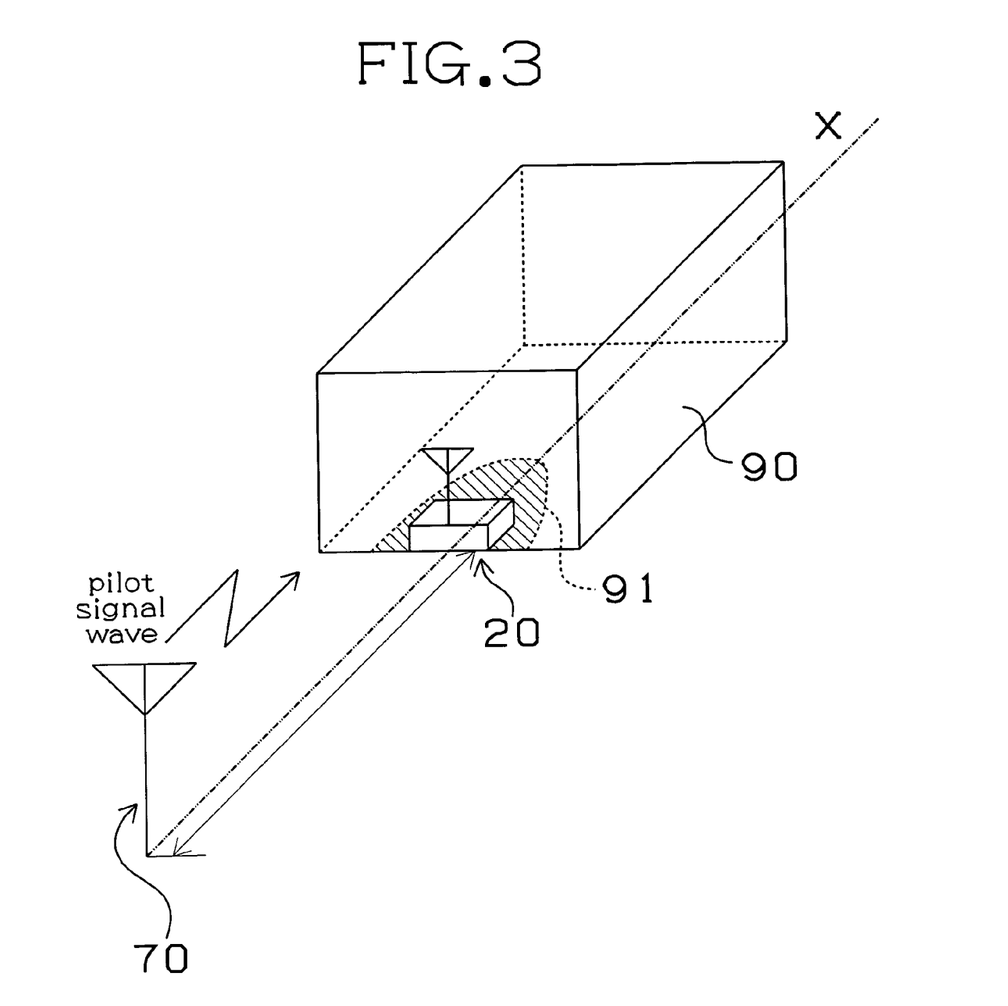
FIG. 3 is a diagram showing the concept of communication breaking performed by the communication breaking device according to the embodiment.

As shown in FIG. 3, the intensity of the pilot signal which is received by the portable telephone and that of the communication breaking signal transmitted from the communication breaking device 20 are varied according to distance L (a direct distance) from a base station 70 and a distance (an indirect distance) from the communication breaking device 20. A case will now be considered in which the communication breaking signal is transmitted with the electric power which is the same as the electric power for transmitting the pilot signal from the base station 70 to the communication breaking device 20. In this case, the communication breaking signal is supplied to the portable telephone with electric power reduced to correspond to attenuation in the electric wave in a quantity corresponding to the difference (the difference in the distance) between the direct distance and the indirect distance. Moreover, the difference in the distance varies among the positions in a communication breaking area 91. Therefore, electric power corresponding to the difference in the distance must be supplied to break the communication at a specific location. Moreover, deviation in the phase of the PN code sequence corresponding to the difference in the distance takes place. Therefore, the correlation of the PN code sequence is undesirably lowered.

When the deviation (time) of the phase corresponding to one bit of the PN code is considered as the wavelength of the PN code which is a value converted into the distance, difference in the distance larger than a half wave of the PN code inhibits easy application. If a communication breaking signal having an excessively intensity is transmitted, the portable telephone undesirably synchronized with the pilot signal having the inverted sign. Thus, error recognition occurs such that the portable telephone is located in the communication area. Moreover, there is apprehension that an adverse influence is exerted on the areas except for the required communication breaking space. The present electric-wave law inhibits transmission of a communication breaking signal having electric power larger than so-called weak electric power (about −66.5 dBm). Therefore, the electric power of the communication breaking device 20 must be controlled in such a manner that a largest communication breaking space is maintained with minimum electric power smaller than the weak electric power. Hence it follows that the following evaluations are performed so that the communication breaking device 20 employs the most effective control of electric power.

The propagation loss of an electric wave in an estimated case of a simplest state can be obtained by the following formula (1) for obtaining a free-space propagation loss:

[Numerical Formula 1]

$$\text{Propagation Loss [dB]}=20.\log 10\text{ (distance [mile])}+20.\log 10\text{ (frequency [MHz])}+37 \qquad (1)$$

The foregoing formula is used to obtain a distance for which the pilot signal transmitted from the standard IS-95 base station with electric power of about 1 W (+30 dBm) is attenuated to the weak electric power (about −66.5 dBm). Thus, a result of about 1724 m is obtained. Assuming that the communication breaking signal transmitted from the communication breaking device 20 with the weak electric power is compensated with the incoming wave having the same electric power, the communication breaking space is limited to the portion along the X axis on which no difference in the distance is caused (see FIG. 3). In actual, compensation is permitted with smaller electric power corresponding to the gain of the communication breaking device 20. A fact is known that the communication breaking space which can be maintained with the weak electric power is reduced when the distance from the base station 70 to the communication breaking device 20 is a short distance.

Figure 4:
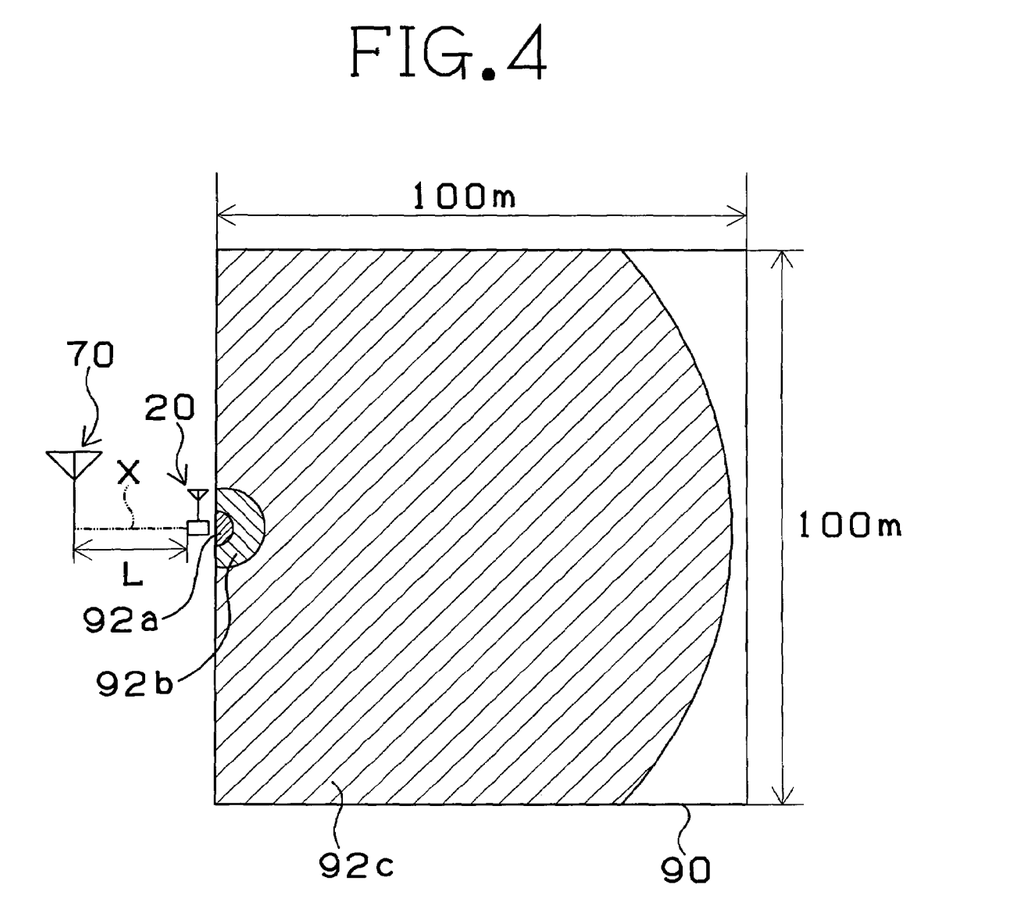
FIG. 4 is a diagram showing a communication breaking area created by using a propagation loss.

A 100 m×100 m room 90 in the form as shown in FIG. 4 is considered. A communication breaking area, which can be maintained with the weak electric power, is obtained for each distance L from the base station 70 to the communication breaking device 20 on the extension of center line X of the room 90. When the distance L is 500 m, 1 km and 5 km, respectively, communication breaking areas are expressed by reference numeral 92*a*, 92*b* and 92*c*, respectively. Maximum values of the losses for the corresponding distances L are 29.0 dBm (500 m), 30.3 dBm (1 km) and 34.2 dBm (5 km). Note that the foregoing values are values factoring in the gain (+6.3 dB) of the communication breaking device 20 to be described later.

Figure 5:
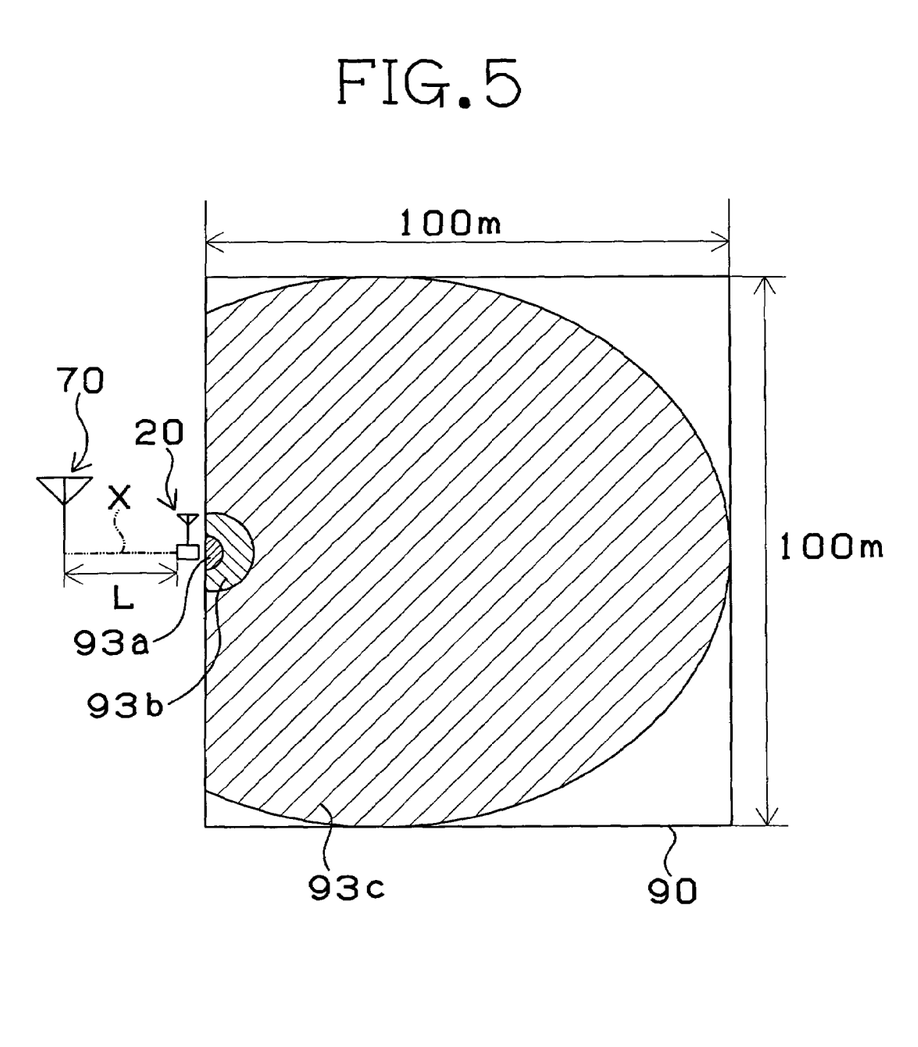
FIG. 5 is a diagram showing a communication breaking area created by using a code correlation loss.

When the loss corresponding to lowering of the correlation of the PN code sequence caused from the deviation of the phase corresponding to the difference in the distance is added to the value shown in FIG. 4 as expressed by numerical formula (2), each communication breaking area is reduced as shown in FIG. 5.

[Numerical Formula 2]

$$\text{Correlation Loss [dB]}=20.\log 10\text{ (1−(difference in distance [m]/half wavelength of code [m])} \qquad (2)$$

A communication breaking area in the 100 m×100 m room 90, which can be maintained with the weak electric power, is obtained for each distance L from the base station 70 to the communication breaking device 20 on the extension of center line X of the room 90. When the distance L is 500 m, 1 km and 5 km, respectively, communication breaking areas are expressed by reference numeral 93*a*, 93*b* and 93*c*, respectively. Maximum values of the losses for the corresponding distances L are 29.2 dBm (500 m), 30.8 dBm (1 km) and 37.7 dBm (5 km).

In accordance with the maximum values of the losses for the corresponding distances L shown in FIGS. 4 and 5, a fact can be understood that the differences in the losses in the communication breaking areas are enlarged in spite of larger communication breaking areas which can be maintained as the distance L from the base station 70 is elongated. Therefore, electric power must be enlarged or reduced to cover the overall area. In accordance with FIG. 4 based on numerical formula (1) and FIG. 5 based on numerical formula (2), the difference in the loss at a position distant from the base station 70 for a distance of 5 km is about 35 dB (34.2 dBm in accordance with FIG. 4 and 37.7 dBm in accordance with FIG. 5). Therefore, a fact can be understood that change in the electric power of the communication breaking wave in a range of −35 dB is an effective method. Thus, this embodiment has a structure that the electric-power amplifier 44 shown in FIG. 1 is arranged to control the gain of electric power with the voltage so as to control electric power with voltage which is periodically (for example, 100 Hz) changed. As a result, the communication can be broken several times during the time for the portable telephone in which the synchronization is trapped. The distance L from the base station 70 may be estimated in accordance with the electric power of the incoming wave so as to determine the foregoing range of electric power.

An experimental model of the communication breaking device 20 was prototyped to perform experiments. Results will now be described with reference to FIGS. 6 and 7. The prototyped communication breaking device 20 had a specification having a frequency band of 800 MHz conforming to IS-95. As a matter of course, the communication breaking device 20 according to this embodiment may be applied to another frequency band, for example, a 2 GHz band. Table 1 shows main specifications.

TABLE 1

Modulating Method
direct diffusion method (BPSK)
Diffusion Code
PN code having a length of 127 bits (m systems)
Width of Diffusion Band
1.25
Frequency of Carrier Wave
band of 800 MHz
Demodulating Method
synchronous wave-detecting method
Intermediate Frequency of Receiving Portion
10.7 MHz
Method of Trapping Frequency
Colpitts type To compare the performance of the communication breaking device 20, a high-frequency amplifier was used to operate a structure (which was called an "inverting amplifier") which simply inverted and amplified an incoming wave so as to again transmit the same. Moreover, an influence of external noise was factored in. Thus, experiments of a cable structure which was free from a considerable influence of external noise and with which stable results were obtained and a wireless structure close to a practical structure were performed so as to evaluate the results. In both of the experiments, DU ratio was obtained in accordance with electric power of the input portion of the receiver (the portable telephone) allowed to pass through the BPF by using the following equation (3). The BPF of the input portion was a BPF set to have a central frequency which was the same as the frequency of the carrier wave. That is, the central frequency was in a band width of 2 MHz in the band of 800 MHz. As an alternative to this, the BPF has a band pass attenuation of 3 dB or 4 dB when the code sequence was 10 MHz.

[Numerical Formula 3]

$$DU \text{ ratio [dB]}=10. \log 10 \text{ (electric power of breaking wave } [W]\text{/electric power of incoming wave } [W]) \quad (3)$$

Figure 6:
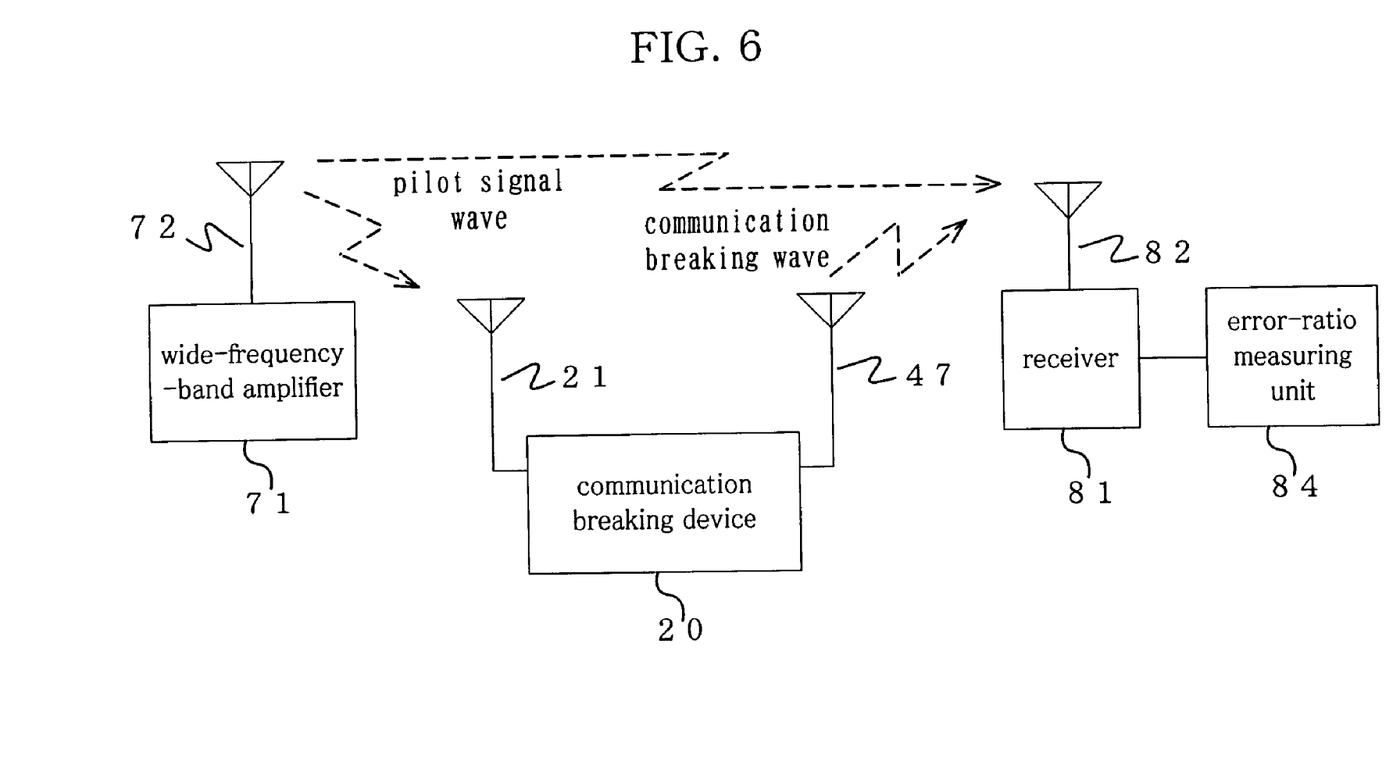
FIG. 6 is a diagram showing the structure of an experimental system for breaking communication which is performed by the communication breaking device according to the embodiment.

The wireless experimental system was measured by the structure shown in FIG. 6. The cable experimental system was structured such that electric wave portions (the pilot wave signal and communication breaking wave) indicated with dashed lines were connected by using cables. Thus, the incoming waves and the communication breaking wave were supplied and mixed. Moreover, a ratio of errors of the pilot signal occurring in the receiver 81 was measured by an error-ratio measuring unit 84.

The DU ratio required for each of the communication breaking device 20 and the inverting amplifier to compensate (to about an error ratio of 0.5) the pilot signal obtained by experiments was measured. Results were shown in Table 2. As expressed by equation (3), the DU ratio was made such that the electric power of the incoming waves was larger than that of the communication breaking wave in a negative state. In a positive state, the electric power of the communication breaking wave was larger than that of the electric power of the incoming wave. In accordance with results of the experiments shown in Table 2, the communication breaking device 20 was able to break the communication with electric power weaker by about 12 dB as compared with the inverting amplifier. That is, the communication breaking space was maintained in both of the diffusion band widths. Assuming that the difference in the gain was caused from delay of the phase occurring in the inverting amplifier, a fact can be understood that the delay was a delay corresponding to two to three wavelengths (2.4 µS to 1.6 µS) of the PN code sequence when the foregoing equation (2) was inversely applied. Another fact was confirmed that the communication breaking space was maintained with electric power which was weaker than that of the incoming wave by 6.3 dB to 4.7 dB.

TABLE 2

| Width of Diffusion Band | 1.25 MHz | 10.0 MHz |
|---|---|---|
| Communication Breaking Device According to Present Invention | −6.3 dB | −4.7 dB |
| Inverting Amplifier | +5.9 dB | +8.7 dB |

The performance was reduced by about 1.6 dB in the case where the width of the diffusion band was 10 MHz as compared with the case in which the width of the diffusion band was 1.25 MHz as shown in Table 2. The reason for this lay in that the accuracy of the communication breaking device 20 for trapping the synchronization deteriorated as the velocity of the PN code was raised. That is, the reason for this lay in that the velocity of the PN code approached the highest operation frequency of the semiconductor which constituted the synchronization trapping unit 36. Therefore, when the synchronization trapping unit 36 is constituted by a semiconductor or the like (for example, a semiconductor made of gallium arsenide) which is able to operate at high speed, the deterioration in the performance can be prevented.

Then, the experiments about the wireless structure were performed such that the transmitter 71, the communication breaking device 20 and the receiver 81 were disposed on a straight line at intervals of 3 m. The operation was evaluated in the range of the weak electric wave. Direct propagation in a free space in a 5 m×10 m wave dark box was assumed. A horizontal half-wavelength dipole antenna (the transmitter antenna 72, the receiving antenna 21, the transmitting antenna 47 and the receiver antenna 82) was used to perform measurement. The experiment of the wireless system was performed such that the communication breaking device 20 shown in FIG. 6 was moved to the transmitter 71 or the receiver 81 to change the distance between the communication breaking device 20 and the receiver 81. While the DU ratio was being varied, the error-ratio measuring unit 84 was used to measure the ratio of errors occurring in the receiver 81. The inverting amplifier was tested such that the inverting amplifier was substituted for the communication breaking device 20. Then, the distance between the inverting amplifier and the receiver 81 was changed to vary the DU ratio. Thus, a ratio of error occurring the receiver 81 was measured by the error-ratio measuring unit 84. To prevent a fact that the communication breaking wave of the communication breaking device 20 did not break trapping of the synchronization of the communication breaking device 20, trapping of the synchronization of the incoming wave was performed only when the breaking was started. No trapping of the synchronization was performed afterwards.

Figure 7:
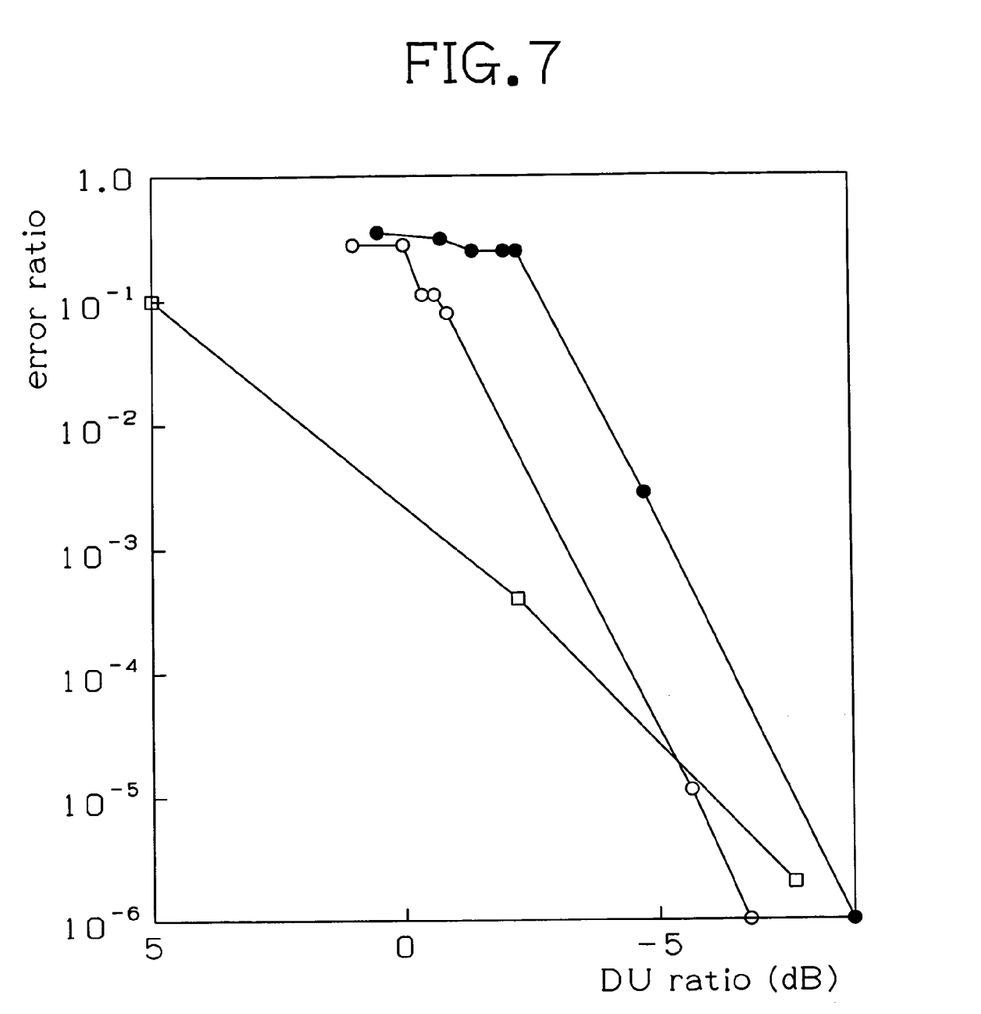
FIG. 7 is a characteristic graph showing the relationship between DU ratios and error ratios.

The relationship between the DU ratio and the error ratio observed in the experiments about the wireless structure is shown in FIG. 7. The characteristic graph shown in FIG. 7 is formed such that results realized in a case where control of electric power was performed by the electric-power amplifier 44 of the communication breaking device 20 were plotted with black circles, those realized in a case where control of electric power was not performed by the electric-power amplifier 44 of the communication breaking device 20 were plotted with white circles and those realized by the inverting amplifier were plotted with white squares.

Assuming that the pilot signal is broken when the error ratio was 0.1 or higher, the communication can be broken with electric power which is weaker than that for the inverting amplifier by about 10 dB, that is, the communication breaking space can be maintained in accordance with the relationship obtained from the foregoing experiments. The experiments of the wireless structure were resulted in similar characteristics to those realized in the experiment about the cable structure in spite of deterioration in the overall performance by about 4 dB owning to an influence of spatial noise and the like.

Interference of the communication of the communication breaking device 20 was performed with the same mean electric power (the DU ratio). In this case, the structures (plotted with black circles) in which the electric power was controlled by the communication breaking device 20 were able to break the communication with electric power which was weaker by about 2 dB. The values indicated a result of a comparison made with the structures (plotted with white circles) in which no control of the electric power was performed by the communication breaking device 20. It can be considered that the reason for this lies in that a somewhat gain is obtained owning to an influence exerted when the electric power was changed.

As can be understood from FIG. 7, omission of the control of the electric power resulted in deterioration in the error ratio as the DU ratio was lowered. On the other hand, the error ratio realized in the case where the electric power was controlled was relatively stable. Therefore, a fact was confirmed that control of the electric power stably enlarged the region, in which error ratios were lower than 0.1. Thus, breaking of communication was realized even in a wide area.

When the electric power is controlled such that communication breaking wave is intermittently transmitted, a period in which transmission of the communication breaking wave from the communication breaking device 20 is interrupted can be created. Therefore, the communication breaking wave of the communication breaking device 20 does not interrupt trapping of the synchronization of the communication breaking device 20 in the foregoing period in which the transmission of the communication breaking wave is interrupted. As a result, the necessity of employing a synchronizing sequence can be eliminated in which the synchronization of the incoming wave is performed only at the start of breaking and following trapping of the synchronization is not performed afterwards. In the foregoing period of interruption, the synchronization of the incoming wave can again be trapped. Therefore, if the communication breaking device 20 is moved, trapping of the synchronization of the incoming wave can sequentially be performed. As a result, the inverted code sequence corresponding to the place to which the communication breaking device 20 has been moved enables the pilot signal to properly be compensated with substantially no delay of the phase.

As described above, the communication breaking device 20 according to this embodiment incorporates the receiving antenna 21, the wide-range amplifier 22, the multiplier 24, the wide-range amplifier 26, the BPF 28, the carrier-wave detector 32, the divider 34, the synchronization trapping unit 36 and the PN-code generator 38. The phase of the PN code sequence extracted by the foregoing units is advanced by the PN-code generator 38 and the delay correcting unit 40. Then, the PN code sequence is, by the inverted-code generator 41, inverted to the inverted code sequence. The inverted code sequence which serves as the communication breaking wave and, the phase of which has been advanced, is transmitted by the multiplier 42, the electric-power amplifier 44 and the transmitting antenna 47. As a result, the inverted code sequence, which is transmitted as the communication breaking wave, is formed into the code sequence inverted from the pilot signal which is transmitted through the pilot channel conforming to the CDMA system. Since the inverted code sequence has the advanced phase, the pilot signal which is being propagated can appropriately be compensated with substantially no delay of the phase. Therefore, the portable telephone conforming to the CDMA system is able to recognize the location at which the pilot signal transmitted from the base station through the pilot channel cannot be received. That is, the location is a position deviated from the communication area from the base station. Hence it follows that an effect can be obtained in that the range in which the portable telephone conforming to the CDMA system cannot perform communication, that is, the communication breaking space, can be maintained.

In the communication breaking device 20 according to this embodiment, the electric-power amplifier 44 for transmitting the inverted code sequence as the communication breaking wave is controlled to reduce the electric power by −35 dB at predetermined periods (for example, 100 Hz). Therefore, deviation of the phase can be complemented by converting the change in the phase caused from a variety of factors into electric power. Thus, the communication breaking device 20 is adaptable to deviation of the phase which is changed randomly. If the propagation passage is complicated such that the indirect passage is included in addition to the direct passage, adaptation to the caused change in the phase is enabled. Thus, the pilot signal which is being propagated and which conforms to the CDMA system can appropriately be compensated with substantially no delay of the phase. As a result, the portable telephone conforming to the CDMA system cannot receive the pilot signal transmitted from the base station through the pilot channel if the propagation passage has been complicated. Therefore, the portable telephone is able to recognize that the location is deviated from the communication area from the base station. Therefore, an effect can be obtained in that a communication breaking space for the portable telephone conforming to the CDMA can be maintained.

In the communication breaking device 20 according to this embodiment, the electric-power amplifier 44 for transmitting the inverted code sequence as the communication breaking wave is so controlled as to intermittently transmit the communication breaking waves. Therefore, a period in which the transmission of the communication breaking wave is interrupted can be created. As a result, the undesirable state can be prevented in which the communication breaking wave transmitted from the communication breaking device 20 inhibits extraction of the PN code sequence from the received incoming wave in the period in which the communication is interrupted. Therefore, the PN code sequence can again be extracted in the above-mentioned period of interruption even after the PN code sequence has temporarily been extracted from the received incoming wave. As a result, the pilot signal can properly be compensated with the inverted code sequence corresponding to the position to which the portable telephone has been moved such that substantially no delay of the position occur. As a result, the portable telephone conforming to the CDMA system cannot receive the pilot signal transmitted from the base station through the pilot channel. Therefore, if the communication breaking device 20 has been moved, an effect can be obtained in that the portable telephone conforming to the CDMA system is able to maintain the communication breaking space at the position to which the communication breaking device 20 has been moved.

In this embodiment, the PN-code generator 38 and the delay correcting unit 40 serving as the phase control means are disposed in front of the inverted-code generator 41 which serves as the code sequence inverting means. The present invention is not limited to the foregoing structure. The delay correcting unit and so forth may be disposed in the rear of the inverted-code generator. Also in the foregoing case, an effect similar to that obtainable from the foregoing structure can be obtained.

This embodiment has the structure that one portable telephone receives the pilot signal wave from one base station. The present invention is not limited to the foregoing structure. The present invention may be applied to a case in which pilot signal waves transmitted from a plurality of base stations are received by one portable telephone and a case in which a plurality of the position waves transmitted from a plurality of base stations are received by a plurality of portable telephones. In the foregoing case, different PN code sequences transmitted from the plural base stations are received. When inverted code sequences adaptable to the corresponding PN code sequences are transmitted, corresponding communication breaking waves can be transmitted to the pilot signal waves transmitted from the plural base stations. Hence it follows that the portable telephone is enabled to recognize a fact that the portable telephone is located at a position deviated from the communication area from all of the base stations. When the portable telephone can be called from a plurality of base stations, an effect can be obtained in that the portable telephone conforming to the CDMA system is able to maintain the communication breaking space. In this embodiment, the velocity of the diffusion code or the width of the diffusion band is set to be 1.25 MHz or 10 MHz. The present invention may be applied to another values, for example, 5 MHz or 20 MHz. If a plurality of portable telephones correspond to different frequency bands, for example, 800 MHz, 1.5 GHz and 2.0 GHz, employment of a multi-band structure adaptable to the corresponding frequency bands enables the communication breaking wave to be transmitted to each of the portable telephones. As a result, an effect similar to that obtainable from the foregoing embodiment can be obtained for each portable telephone.

In the foregoing embodiment, the pilot signal wave is received from the base station. The present invention is not limited to the foregoing structure. The present invention may be applied to a case in which the synchronized signal wave is received. In the foregoing case, the PN-code generator 38 and so forth of the communication breaking device 20 are so structured as to transmit inverted code sequence adapted to the synchronized code sequence. As a result, the synchronized signal wave is interrupted with the communication breaking wave so that establishment of the synchronization of the portable telephone is prevented. Therefore, an effect can be obtained in that the communication breaking space can be maintained for the portable telephone conforming to the CDMA if the portable telephone is located in the communication area from the base station. Also the present invention may be applied to a case where a paging signal wave, an access signal wave or a conversation signal wave is received. Moreover, the foregoing signal waves may be interrupted with corresponding communication breaking waves in a stepped manner in an order as the pilot signal wave, the synchronization signal wave, the paging signal wave (the access signal wave) and the communication signal wave in accordance with a state of interruption of the communication. Therefore, if interruption of the communication using the pilot signal wave fails, communication breaking waves are transmitted which include the synchronization signal wave, the paging signal which (the access signal wave) and the communication signal wave and which sequentially interrupt the communication. Therefore, an effect can be obtained in which the communication breaking space can furthermore reliably be maintained for the portable telephone conforming to the CDMA system.

In this embodiment, the inverted code sequence adapted to the PN code sequence is transmitted to break the communication. The present invention is not limited to this. For example, an inverted code sequence adaptable to a synthesized code may be transmitted to break the communication. Also in this case, a similar effect can be obtained.

According to the present invention, a code sequence extracted by a code sequence extracting means is inverted into an inverted code sequence by a code sequence inverting means. The advanced inverted code sequence is, as communication breaking wave, transmitted from a breaking-wave transmitting means. Thus, the inverted code sequence, which is transmitted as the communication breaking wave, is formed into a code sequence inverted from a predetermined code sequence obtained by modulating information about the contents of the communication. Moreover, the phase of the inverted code sequence has been advanced. Therefore, the predetermined code sequence, which is being propagated, can appropriately be compensated with substantially no delay of the phase owning to the advanced inverted code sequence. The receiving-side communication apparatus is inhibited to demodulate the contents of communication at the position at which a predetermined code sequence obtained by modulating information about the contents of the communication. That is, a communication breaking device for modulating information about the contents of communication with a code sequence is able to maintain a range in which communication is inhibited, that is, a communication breaking space.

According to the present invention, the advancement is performed by the phase control means in a quantity corresponding to at least one code of the extracted code sequence or the inverted code sequence. Therefore, the inverted code sequence can be transmitted previously for a time corresponding to the one code. If the phase is delayed owning to signal processes which are performed by the code sequence extracting means, the code sequence inverting means, the phase control means and the breaking-wave transmitting means, an influence of the delay can be eliminated in the foregoing period of time. A predetermined code sequence obtained by modulating information about the contents of communication which is being propagated can appropriately be compensated with the inverted code sequence, the phase of which has been advanced in a quantity corresponding to at least one code. Therefore, the receiving-side communication apparatus is inhibited to demodulate the contents of the communication. That is, an effect can be obtained in that a communication breaking space can be maintained for the communication apparatus for modulating information about the contents of the communication with the code sequence.

According to the present invention, the breaking-wave transmitting means incorporates electric-power amplifying means which is capable of arbitrarily control an amplification gain. Therefore, deviation of the phase can be complemented by converting change in the phase occurring due to various factors into electric power. Hence it follows that deviation of the phase which is changed randomly can be absorbed. If the propagation passage is complicated such that an indirect propagation passage is included in addition to a direct propagation passage, a predetermined code sequence obtained by modulating information about the contents of communication, which is being propagated, can appropriately be compensated with substantially no delay of the phase in such a manner as to correspond to change in the phase caused from the complicated propagation passage. If the propagation passage is complicated, the receiving-side communication apparatus is inhibited to demodulate the contents of the communication. That is, an effect can be obtained in that a larger communication breaking space can be maintained for the communication apparatus for modulating information about the contents of the communication with a code sequence.

According to the present invention, the breaking-wave transmitting means intermittently transmits the communication breaking wave. Therefore, a period of time in which transmission of the communication breaking wave is interrupted can be created. As a result, a fact that the communication breaking device cannot extract the predetermined code sequence from the received incoming wave owning to the communication breaking wave transmitted from the communication breaking device can be prevented in the foregoing period of time in which the transmission is interrupted. Therefore, even after the predetermined code sequence has temporarily been extracted from the received incoming wave, the predetermined code sequence can again be extracted during the foregoing interruption period of time. If the communication breaking device is moved, appropriate compensation with substantially no delay of the phase is permitted with the inverted code sequence corresponding to the position at which a predetermined code sequence can be extracted from the received incoming wave, that is, the position to which the communication breaking device has been moved. Therefore, the receiving-side communication apparatus is inhibited to demodulate the contents of the communication. That is, an effect can be obtained in that a communication breaking space can be maintained at the position to which a communication apparatus for modulating information about the contents of the communication with a code sequence has been moved.

According to the present invention, the incoming waves are transmitted from a plurality of the communication apparatuses. Therefore, the advanced inverted code sequences are, as communication breaking waves corresponding to the plural communication apparatuses, transmitted from the breaking-wave transmitting means. As a result, the predetermined code sequences which are transmitted from the plural communication apparatuses can appropriately be compensated with the inverted code sequences corresponding to the plural communication apparatuses with substantially no delay of the phase. An effect can be obtained in that a larger communication breaking space can be obtained which receives a pilot code sequence from a plurality of communication apparatuses and which modulates information about the contents of the communication with a code sequence.

A communication breaking method adapted to a communication method which modulates or demodulates information about contents of communication with a predetermined code sequence, the communication breaking method according to the present invention comprising the step of: compensating the code sequence in an incoming wave by transmitting a communication breaking wave. The code sequence is compensated. Thus, demodulation of information is inhibited so that communication is broken. According to the foregoing communication breaking method, a communication breaking space can be created in the vicinity of an intersection of a road or an inside portion of an automobile. Therefore, human life can be saved from a traffic accident caused from the portable telephone.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A communication breaking method adapted to a communication method that modulates or demodulates information about contents of communication with a predetermined code sequence, said communication breaking method comprising:
   extracting the predetermined code sequence from a received incoming wave;
   inverting the code sequence, extracted by said extracting, to provide an inverted code sequence;
   advancing the phase of the extracted code sequence or the phase of the inverted code sequence in a quantity corresponding to at least one code of the extracted or inverted code sequence; and
   compensating the code sequence in an incoming wave by transmitting the inverted code sequence having the advanced phase as a communication breaking wave.

2. A communication breaking method according to claim 1, further comprising:
   obtaining a communication breaking space.

3. A communication breaking method according to claim 1, wherein said transmitting the inverted code sequence having the advanced phase as a communication breaking wave comprises amplifying the communication breaking wave and arbitrarily controlling an amplification gain.

4. A communication breaking method according to claim 1, wherein said transmitting the inverted code sequence having the advanced phase as a communication breaking wave comprises intermittently transmitting the communication breaking wave.

5. A communication breaking method according to claim 1, further comprising receiving the received incoming wave, wherein said receiving comprising receiving the incoming wave transmitted from a plurality of the communication apparatuses.

6. A communication breaking method according to claim 1, wherein the communication breaking method is adapted for a portable telephone.

7. A communication breaking method according to claim 1, wherein the communication breaking method is adapted for a CDMA (Code Division Multiple Access) system.

* * * * *